United States Patent
Gottlieb

[15] 3,665,839
[45] May 30, 1972

[54] POPCORN POPPER

[72] Inventor: Robert Gottlieb, 185 West End Avenue, New York, N.Y. 10023

[22] Filed: Mar. 25, 1970

[21] Appl. No.: 22,415

[52] U.S. Cl. ..........................................................99/238.6
[51] Int. Cl. .........................................................A23l 1/18
[58] Field of Search ..............99/238.5, 238.6, 238.7, 238.1, 99/238.3, 238.4, 238.2, 238 R

[56] References Cited

UNITED STATES PATENTS

| | | | |
|---|---|---|---|
| 1,839,671 | 1/1932 | Hale | 99/238.5 X |
| 3,059,567 | 10/1962 | Lindemann | 99/238.6 |
| 2,123,663 | 7/1938 | Roach | 99/238.7 X |
| 2,175,531 | 10/1939 | Kortum, Jr. | 99/238.2 |
| 3,294,546 | 12/1966 | Fingerhut | 99/238.6 X |

Primary Examiner—Walter A. Scheel
Assistant Examiner—Alan I. Cantor
Attorney—Eugene E. Geoffrey, Jr.

[57] ABSTRACT

A popcorn popper having an outer housing, heating means within the housing and a cage assembly extending upwardly from the heating means with a tubular portion of the assembly extending through the upper wall of the housing, the cage having an open portion and an inclined deflector opposite the open portion so that corn to be popped which is introduced through the tubular portion will upon popping be deflected by the deflector through the open portion of the cage and retained within that portion of the outer housing surrounding the heating means. The outer housing also includes an inclined bottom portion and a hinged closure which can be opened to remove the popped corn.

7 Claims, 6 Drawing Figures

Patented May 30, 1972  3,665,839
2 Sheets-Sheet 1
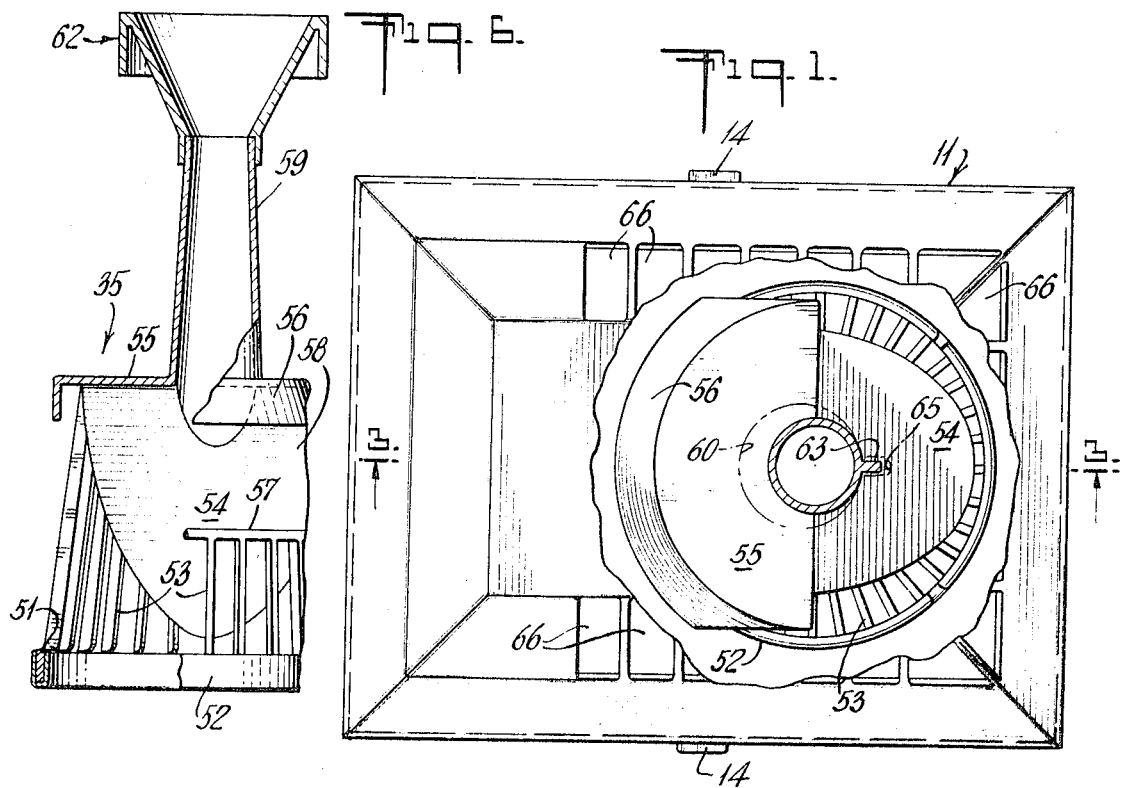
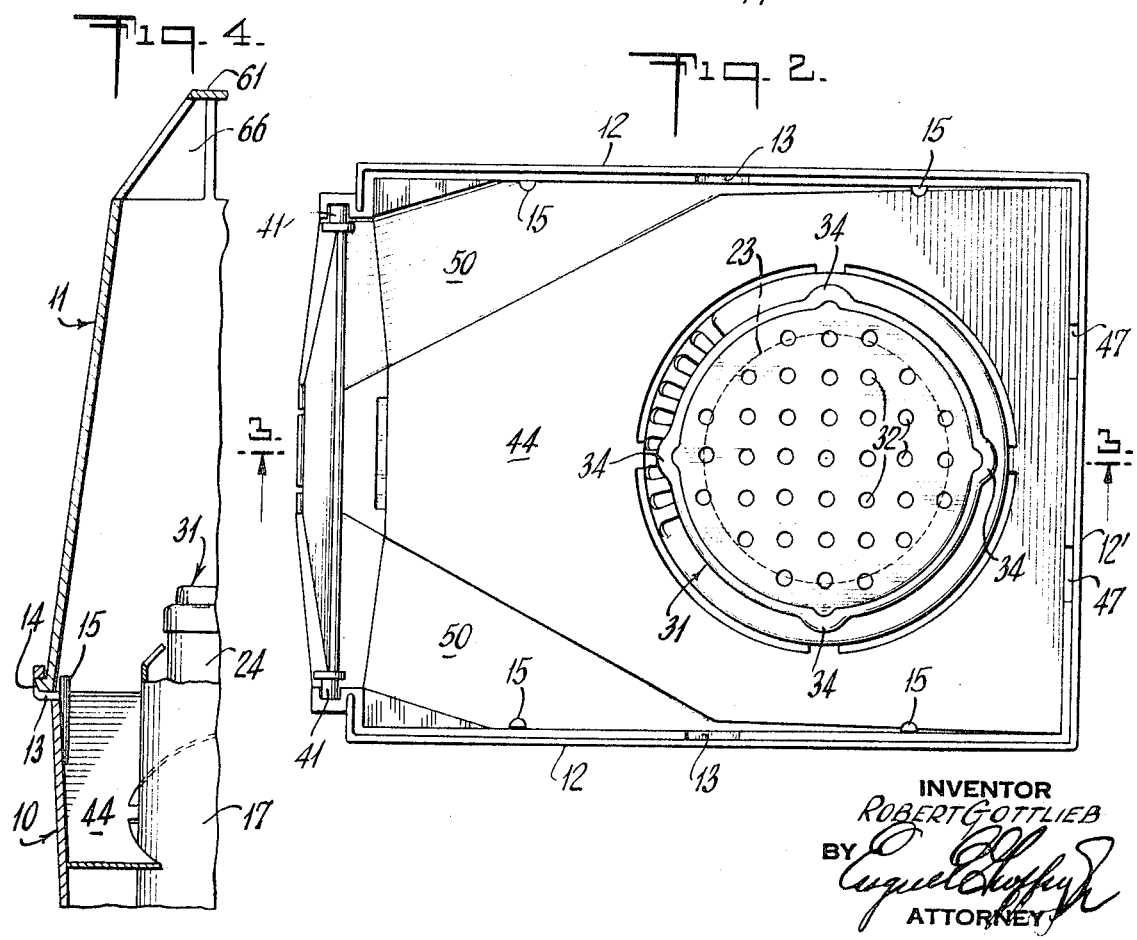
INVENTOR
ROBERT GOTTLIEB
BY
ATTORNEY Patented May 30, 1972
3,665,839
2 Sheets-Sheet 2
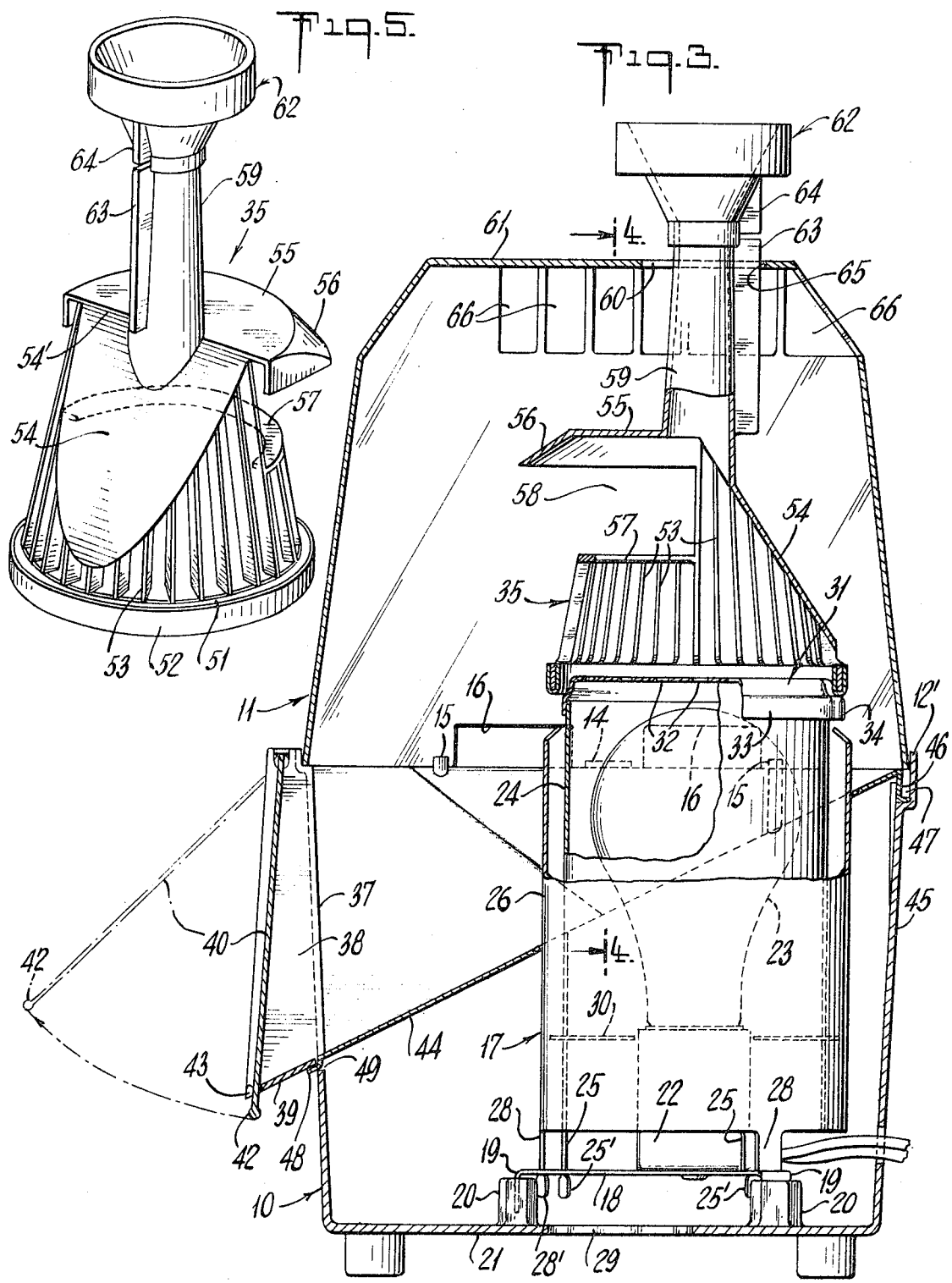
INVENTOR
ROBERT GOTTLIEB
BY
ATTORNEY

POPCORN POPPER

This invention relates to an electric popcorn popper and more specifically to a novel and improved popper having heating means for popping the corn without the need for shortening, a cage cooperating with the heating means to retain the unpopped corn in contact with the heating means and effecting ejection of the popped corn from the cage.

The device in accordance with this invention constitutes an improvement of an invention disclosed in an application for patent by Robert Gottlieb, Ser. No. 819,261, filed Apr. 25, 1969 now U.S. Pat. No. 3,570,388, entitled POPCORN POPPER.

The device in accordance with this invention embodies an improved cage assembly associated with the heater which not only enables corn to be popped to be fed into the cage and into contact with the heating means but also embodies a cage construction which includes an opening and deflecting means positioned in such a manner relative to said opening so that as the kernels of corn explode and pop upwardly they will be deflected by the deflector outwardly through the opening and be retained within the outer housing. By reason of the improved construction of the cage, it is possible to feed additional corn to be popped into the cage through the top opening after some or all of the corn previously popped has been automatically ejected from the cage.

Accordingly, one object of the invention resides in the provision of a novel and improved corn popper which enables corn to be popped without the need for shortening and permits substantially continuous operation by providing for the automatic ejection of popped corn from the heating means to a storage area surrounding the heating means.

Another object of the invention resides in the provision of a novel and improved corn popper which is characterized by its simplicity, ease of operation, and complete safety.

The above and other objects of the invention will become more apparent from the following description and accompanying drawings forming part of this application.

In the drawings:

FIG. 1 is a top view of a corn popper in accordance with the invention and with a portion broken away to show the cage assembly;

FIG. 2 is a top view of the structure shown in FIG. 1 with the upper housing portion and cage removed;

FIG. 3 is a vertical cross-sectional view of the corn popper in accordance with the invention and taken along the line 3—3 of FIG. 1;

FIG. 4 is a cross-sectional view of FIG. 3 taken along the line 4—4 thereof;

FIG. 5 is a perspective view of the cage assembly in accordance with the invention; and FIG. 6 is a fragmentary cross-sectional view of the cage shown in FIG. 5.

Referring now to the drawings, the corn popper in accordance with the invention includes a lower housing portion 10 and an upper housing portion 11, the latter being removably engageable with the lower housing portion 10. More specifically, the lower housing portion 10 includes an upwardly extending offset flange 12 along the side walls and a flange 12' along the rear wall to receive the lower edges of the upper housing portion 11. A pair of slots 13 on the side walls of the lower housing portion 10 and disposed immediately below the flanges 12 receive tabs 14 carried by the upper housing portion 11. Four posts 15 formed integrally with the side walls engage the inner surface of the upper housing portion when in place on the bottom housing portion 10 to hold the tabs 14 in engagement with the slots 13. To facilitate joinder of the housing portions, the upper housing portion has cutouts 16 disposed on each side of the tabs 14 to facilitate deflection of the tabs to facilitate engagement with the slots 13.

The lower housing portion 10 includes a heating assembly generally denoted by the numeral 17. The heating assembly includes a triangularly shaped base 18 having three downwardly extending legs 19 which are fixedly retained within upwardly extending tubular members 20 integrally formed with the bottom 21 of the lower housing portion 10. A conventional lamp socket 22 is secured centrally of the base 18 and carries a lamp 23 used as the heating source. A circular metal shield 24 surrounds the lamp 23 and is secured to the base 18 by downwardly extending legs 25. The legs 25 may be secured to the base 18 by any suitable means such as tabs 25' extending through cooperating openings in the base 18. A second outer shield 26 surrounds the inner shield 24 and has a plurality of spaced tabs 27 about the upper edge thereof and extending inwardly toward the inner shield 24. The outer shield is secured to the base 18 by legs 28 having tabs 28' engaging corresponding openings in the base 18. The lower edges of the shields 24 and 26 are spaced from the base 18 and the bottom 21 of the lower housing portion 10 includes a plurality of openings 29 to provide for the free flow of air upwardly between the two shields. A horizontally disposed heat reflecting shield 30 is carried by the inner shield 24 and is disposed approximately about the upper edge of the socket 22 to protect the socket and at the same time to reflect heat from the lamp upwardly. The upper edge of the inner shield 24 carries a cover member 31 having a plurality of perforations 32 therein. The periphery 33 of the cover 31 has a downwardly extending offset flange as will be observed more clearly in FIG. 3 and four outwardly extending portions 34 to support the cage assembly generally denoted by the numeral 35 which will be described.

The front wall 36 of the lower housing 10 has a generally triangularly shaped opening 37 having outwardly extending flanges 38 along the sides thereof and a downwardly and outwardly sloping bottom flange 39. A gate 40 is carried by trunions 41 engaging cooperating openings in the upper edges of the side flanges 38 and the bottom edge 42 of the gate 40 frictionally engages a cooperating slot 43 in the bottom flange 39 to hold the gate in the closed position. An inclined member or chute 44 surrounds the heating means 17 and is secured to the rear wall 45 of the lower housing portion 10 by downwardly extending tabs 46 engaging cooperating slots 47. The lefthand or front edge of the chute 44 as viewed in FIG. 3 has an offset tab 48 engaging a cooperating slot 49 in the front wall portion 36. Side portions 50 of the chute extend from the top edge of the side walls of the housing downwardly and inwardly so that the front edges of the inclined portions are substantially aligned with the edges of the front opening 37. In this way all popped corn ejected from the cage 35 will move downwardly toward the opening 37 so that it may be readily removed by opening the gate 40.

The cage 35 as shown more clearly in FIGS. 3, 5, and 6 may be formed of any suitable material though in the instant embodiment of the invention it is formed of plastic. More specifically the cage assembly 35 includes a bottom ring 51 enclosed within a peripheral metal channel 52, the latter resting on the cover 31 of the heating means 17. A plurality of ribs 53 extend upwardly and inwardly from the ring 51. The rearward or righthand side of the cage as shown in FIG. 3 is in the form of an inclined wall 54 of generally elliptical configuration which extends from a point spaced above the ring 51 to the top of the cage as may be observed more clearly in FIG. 5. The upper edges of the ribs 53 forming the rear portion of the cage 35 are integrally joined with the inclined wall or deflector 54.

The top of the cage 35 is provided with a substantially horizontal semi-circular plate 55 having a downwardly and outwardly extending flange 56 about at least a portion of its periphery. The plate 55 is integrally joined with the wall 54 along the upper edge 54' of the wall 54 as may be observed more clearly in FIG. 5. A semi-circular member 57 is integrally joined to two opposing side ribs 53 and is spaced a substantial distance below the plate 55. The front ribs 53 of the cage extend upwardly to and are integrally joined with the semi-circular member 57 so that a relatively large opening 58 is formed about the forward portion of the cage 35.

The cage 35 further includes an upwardly extending tubular member 59 which is integrally joined with the deflector 54 and plate 55 and communicates with the inside of the cage. The upper end of the tubular member 59 extends through an enlarged cooperating opening 60 in the top 61 of the upper housing portion 11 and carries a funnel shaped element 62 which is fixedly secured thereto. The tubular member 59 and the funnel-shaped member 62 carry vertically disposed aligned flanges 63 and 64, respectively, which engage a slot 65 in the rear edge of the opening 60 as may be observed more clearly in FIGS. 1 and 3 in order to prevent rotation of the cage assembly. The upper housing portion 11 includes in addition to the upper opening 60, a plurality of openings 66 about the upper portion thereof and immediately above the heating means to provide for the free flow of air through the housing.

With the invention as described above, corn to be popped is inserted through the funnel-shaped member 62 and is retained within the cage 35 by engagement of the metal channel 52 with the cover 31 as shown for instance in FIG. 3. Heat from the lamp 23 or other suitable heating source causes the kernels to explode and this action will cause the exploded kernels to move upwardly with sufficient force so that upon engagement with the deflector 54 their paths of movement will be deflected outwardly toward the opening 58. Depending on the position of the kernel within the cage 35 at the time it explodes or pops, it will either be deflected outwardly through the opening 58 or may be deflected upwardly against the plate 55 and thence outwardly into the area surrounding the heating means 17.

The inclined chute 44 which is preferably made of metal and closely surrounds the heating means guides the popped corn downwardly toward the opening 37. In addition, it will absorb some heat from the heating means 17 and thereby function in combination with the heating means to keep the popped corn warm. With this arrangement as the corn is popped and ejects itself from the cage 35, additional corn can be inserted so that a substantially continuous process can be maintained. In the event kernels of corn within the cage 35 do not pop, it is possible to remove them by merely grasping the funnel-shaped member 62 and lifting the cage from the surface of the heating means 17 so that it may be tilted relative to the heating means to remove the kernels from the surface thereof.

While only one embodiment of the invention has been illustrated and described, it is apparent that alterations, modifications and changes may be made without departing from the true scope and spirit thereof as defined by the appended claims.

What is claimed is:

1. A popcorn popper comprising a housing having an opening in the top thereof, heating means within said housing and a cage assembly engaging and extending upwardly from said heating means, said cage assembly including a cage having an opening in one side thereof, an inclined deflector on the other side of said cage, a tubular member secured to and communicating with said cage and extending upwardly therefrom and through said housing for feeding corn to be popped into said cage and into contact with said heating means, and means carried by said cage assembly for maintaining a predetermined orientation between the housing and cage, said corn when popped being deflected by said deflector outwardly through said opening and into the area of said housing surrounding said heating means, said cage including a top plate extending outwardly from the top edge of said deflector adjoining the top of said opening, the outward edge of said top plate being arcuate and having a downwardly and outwardly extending flange about the edge thereof and wherein said cage is of generally annular configuration, said deflector is in the form of a generally partial ellipse terminating at its upper edge in a line parallel to the minor axis of said ellipse, the lower edge of said opening is bounded by an arcuate member and the sides of said cage constitute a plurality of upwardly extending spaced ribs with certain of the last said ribs joined at their upper ends to the edges of said deflector and other ribs joined at their upper ends to said arcuate member.

2. A popcorn popper comprising a housing having an opening in the top thereof, heating means within said housing and a cage assembly engaging and extending upwardly from said heating means, said cage assembly including a cage having an opening in one side thereof, an inclined deflector on the other side of said cage, a tubular member secured to and communicating with said cage and extending upwardly therefrom and through said housing for feeding corn to be popped into said cage and into contact with said heating means, and means carried by said cage assembly for maintaining a predetermined orientation between the housing and cage, said corn when popped being deflected by said deflector outwardly through said opening and into the area of said housing surrounding said heating means, said housing including releasably engageable upper and lower portions, said lower portion including tubular heating means and a generally triangularly shaped opening in one side thereof and having inclined side edges, and a sharply inclined chute surrounding said heating means and extending from a line adjoining the upper edge of said lower housing portion downwardly to the lower edge of said opening, said chute having inclined side walls adjoining said opening with the forward edges of said walls being substantially coincident with the side edges of said opening.

3. A popcorn popper according to claim 2 wherein said cage includes a top plate extending outwardly from the top edge of said deflector and forming the top of said opening, the outward edge of said top plate being arcuate and having a downwardly and outwardly extending flange about the edge thereof.

4. A popcorn popper according to claim 3 wherein said cage is of generally annular configuration, said deflector is in the form of a generally partial ellipse terminating at its upper edge in a line parallel to the minor axis of said ellipse the lower edge of said opening is bounded by an arcuate member and the sides of said cage constitute a plurality of spaced upwardly extending ribs with certain of the last said ribs joined at their upper ends to the edges of said deflector and other ribs joined at their upper ends to said arcuate member.

5. A popcorn popper according to claim 2 wherein said housing opening includes a slot in the edge thereof and said tubular member includes a flange engaging said slot.

6. A popcorn popper comprising a base, heating means carried and extending upwardly from said base, a tubular cage having an open bottom releasably engaging said heating means and extending upwardly therefrom, said cage having an inclined deflector on one side thereof and an opening in the side thereof opposite said deflector, a tubular member secured to the top of said cage and extending upwardly therefrom and cage surrounding means carried by said base and extending upwardly therefrom whereby corn fed into said cage through said tubular member will rest on said heating means and upon exploding will be deflected by said deflector and emerge from said cage through the opening therein and will be retained by said base and cage surrounding means.

7. In a popcorn popper, a cage having a tubular wall structure formed by a plurality of spaced upwardly extending ribs and an open bottom adapted to rest upon heating means, an inclined deflector carried by said wall structure, said wall structure having an enlarged opening therein on the side opposite said deflector and tubular means secured to the upper end of and communicating with said cage for feeding corn to be popped on to said heating means whereby said popped corn upon striking said deflector is deflected outwardly through said opening.

* * * * *